United States Patent Office 2,980,703
Patented Apr. 18, 1961

2,980,703

2,2-BIS - (HYDROXYMETHYL) - 3,4 - DIHYDROPYRAN AND DERIVATIVES THEREOF AND PROCESSES FOR THEIR PREPARATION

Andrew P. Dunlop, Riverside, and Daniel S. P. Eftax, Barrington, Ill., assignors to The Quaker Oats Company, Chicago, Ill., a corporation of New Jersey
No Drawing. Filed Mar. 30, 1959, Ser. No. 802,652
8 Claims. (Cl. 260—345.9)

This invention relates to new and novel compounds, and more particularly to 2,2-bis(hydroxymethyl)-3,4-dihydropyran, derivatives thereof, and to processes for the preparation of these new compositions of matter.

The novel compound, Compound I, has the chemical structure indicated below:

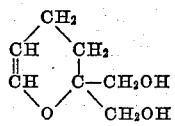

Compound I

It is prepared by reaction of formaldehyde with 2-formyl-3,4-dihydro(2H)-pyran (so-called acrolein dimer) in the presence of an alkaline condensing agent. Acrolein dimer is obtainable from the Shell Chemical Corporation and the Union Carbide Corporation.

In a more specific embodiment of this invention 2-formyl-3,4-dihydro(2H)pyran is slowly added to a mixture consisting of aqueous or aqueous-alcoholic formaldehyde and an alkaline condensing agent, the mixture being maintained at a low temperature, i.e. within the range of about 10° C. to about 60° C. during this addition. After a relatively short reaction period, depending on the temperature employed and the yield desired, the product is recovered from the reaction mixture by conventional methods known to those skilled in the art, for example, by fractional distillation and/or crystallization. If necessary external cooling is used to keep the temperature from exceeding the aforesaid range in order to minimize side reactions which might impair completion of the desired reaction.

As the alkaline condensing agent, in the above specific embodiment, sodium hydroxide is satisfactory, preferably in an amount providing a molar ratio of sodium hydroxide to 2-formyl-3,4-dihydro(2H)pyran of at least about 1:1. Other agents which are effective include lime, barium hydroxide, potassium hydroxide, other alkali metal and alkaline earth metal hydroxides, and basic ion-exchange resins, the amount employed preferably being sufficient to provide at least about one equivalent weight of alkaline agent per mole of 2-formyl-3,4-dihydro(2H)-pyran.

The amount of formaldehyde employed in the aforesaid specific embodiment is preferably not less than about 2 moles per mole of the 2-formyl-3,4-dihydro(2H)pyran. The aqueous solution of formaldehyde is preferably one containing about 5% to about 40% by weight of formaldehyde. In recovering the desired product from the reaction mixture, a variety of procedures will be readily apparent to those skilled in the art. Preferably the reaction mixture (previously neutralized with an acid such as formic acid, or as is) is concentrated, for example by distillation. The concentrate so obtained is diluted with any solvent for Compound I which is later easily separated therefrom (e.g. saturated low-boiling aliphatic alcohols and methyl isobutyl ketone). The resulting solid phase and liquid phase are separated. The desired product, Compound I, is then preferably recovered from the liquid phase by fractional distillation.

The following examples are illustrative of the preparation of Compound I, though not limiting inasmuch as many variations may be made therein without departing from the spirit or scope of the invention. Except as noted otherwise, all parts and percentages are by weight.

*Example 1*

One hundred and twelve parts of 2-formyl-3,4-dihydro-(2H)pyran was added incrementally over 1.5 hours to a mixture comprising 47.5 parts of sodium hydroxide in 155 parts of water and 202 parts of a 37% formaldehyde solution. The temperature during the addition was maintained at 20° C. and then kept below 30° C. for 2 additional hours. Following this period the mixture was heated to 55–60° C. and kept at that temperature for 3.25 hours. One-half of the reaction mixture was concentrated until solid matter (sodium formate) began to precipitate. The solids were filtered, rinsed with isobutanol, and the rinsings combined with the filtrate and distilled under reduced pressure. In this way there was obtained 50 parts of the desired product, Compound I, boiling at 102.5–109° C./0.6–0.85 mm. Hg. The other half of the reaction mixture was extracted four times with a total of about 200 parts of isobutanol. Distillation of the isobutanol extract under reduced pressure gave 52 parts of product, Compound I, boiling at 101–107° C./0.35–0.6 mm. Hg. The combined yield was about 71% of the theoretical. The product, Compound I, was a colorless liquid which, when pure, crystallized on standing at room temperature. A purified sample, recrystallized from a benzene-Skellysolve B mixture, melted at 51–52° C., and analyzed 58.40% carbon and 8.29% hydrogen, compared to theoretical values of 58.31% carbon and 8.39% hydrogen. The bis-p-nitrobenzoic ester of Compound I was prepared as an identifying derivative. It melted at 138–139° C., and analyzed 57.03% carbon, 4.16% hydrogen and 6.39% nitrogen compared to theoretical values of 57.01%, 4.10% and 6.33%, respectively.

*Example 2*

One hundred and twelve parts of the same 2-formyl-3,4-dihydro(2H)-pyran as was employed in Example 1 was added to alkaline formaldehyde solution (same quantities as Example 1) over a period of 1.25 hours while keeping the temperature at about 20° C. during the addition and for 60 minutes thereafter. The mixture was stirred for an additional 1.5 hours during which period the temperature rose to a high of 29° C. Following this period, the mixture was heated to 52–60° C. for 2.5 hours and then allowed to stand for 40 hours at 25° C. The resulting reaction mixture was extracted five times with a total volume of about 280 parts of isobutanol and was then concentrated under reduced pressure causing the precipitation of sodium formate. The precipitate was filtered off and washed with isobutanol. The combined filtrate and isobutanol used in washing were then further distilled to obtain further concentration. Final distillation gave a product, Compound I, boiling in the range of 105–111° C./0.5–0.9 mm. Hg. The yield was 119.5 parts or 83% of the theoretical.

Under acidic conditions, the new compound, Compound I, undergoes an intra-molecular addition reaction (intra-reaction) to form the isomeric 1-hydroxymethyl-6,8-dioxabicyclo(3.2.1)-octane, Compound II. This is also a new composition of matter, having the structure shown below:

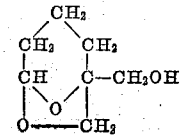

Compound II

A variety of acid-reacting substances catalyze the formation of Compound II from Compound I. Among these are the mineral acids and acid-reacting salts thereof, and the so-called Lewis acids. Carboxylic acids also catalyze the isomerization. The quantity of the acidic catalyst required is variable depending upon acid strength, rate of reaction desired, etc. A reaction solvent is preferably employed and includes such solvents for the starting materials as tetrahydrofuran, tetrahydropyran, ethyl ether and saturated low-boiling alcohols. The reaction mixture is preferably neutralized with a basic reactant prior to recovery of the desired product by conventional means such as fractional distillation. The following examples are illustrative:

Example 3

A solution of 14.4 parts of 2,2-bis(hydroxymethyl)-3,4-dihydropyran, Compound I, in 25 parts of ethyl ether was added with stirring to a solution of 0.34 part of boron trifluoride in approximately 6 parts of ethyl ether over a period of 3 minutes. The temperature rose from 25° C. to 33° C., and remained there for 5 minutes, after which the mixture was brought to reflux. After 2 hours with constant stirring, one part of concentrated ammonium hydroxide was added. The reaction mixture was then filtered and the ethyl ether removed by distillation. From the residual material, further distillation produced 13 parts of the desired product, Compound II, boiling at 54–65° C. at 0.18–0.2 mm. Hg. A purified sample boiled at 45° C. at 0.05 mm. Hg, $n_D^{25}$ 1.4790, and analyzed 58.48% carbon and 8.13% hydrogen compared to the theoretical values of 58.31% carbon and 8.39% hydrogen. The product, Compound II, was a colorless liquid, the p-nitrobenzoic ester of which was prepared as an identifying derivative. This derivative melted at 94.5–95° C. and gave an analysis of 57.27% carbon, 5.27% hydrogen and 4.91% nitrogen as compared to the theoretical values of 57.33%, 5.16%, and 4.78%, respectively.

Example 4

One drop of concentrated hydrochloric acid was added to a solution of 14.4 parts of 2,2-bis(hydroxymethyl)3,4-dihydropyran, Compound I, in 20 parts of ethanol. The mixture was allowed to stand for 3 hours with occasional agitation after which period a few pellets of sodium hydroxide were added. The ethanol was removed under reduced pressure and final distillation produced 10.5 parts of the desired product, Compound II, boiling at 63–5° C. at 0.375 mm. Hg and at 80.5–82° C. at 1.25 mm. Hg. The p-nitrobenzoic ester of this material melted at 94.5–95° C. and showed no depression in melting point when mixed with the p-nitrobenzoic ester prepared in Example 3.

By saturating Compound I with hydrogen, there is obtained the new compound, 2,3-bis(hydroxymethyl)tetrahydropyran, Compound III, having the structure shown below:

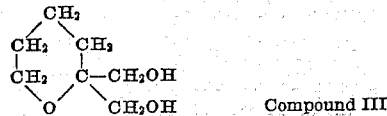
Compound III

When preparing Compound III from Compound I, the conversion is preferably carried out by the process known as catalytic hydrogenation. As applied to Compound I as isolated in Examples 1 and 2, the hydrogenation is carried out in the absence of a reaction solvent, but is preferred to employ a solvent, which may be water, tetrahydrofuran, tetrahydropyran, low-boiling saturated aliphatic alcohols or other like solvents which will be apparent to those skilled in the art. Alternatively, Compound III may be obtained by catalytic hydrogenation of Compound I prior to isolation of the latter. Thus, in one embodiment of this invention, it is preferred to hydrogenate the crude reaction mixture of Examples 1 and 2 at any stage prior to the final recovery of Compound I. Such processing in situ offers distinct economic advantages, and these are further enhanced by a third alternative procedure which may employ a lesser quantity of formaldehyde in the initial step described above for the preparation of Compound I. In this third embodiment of the invention, Compound III is prepared employing the reagents described for Compound I, but with the following exceptions: (1) The molar ratio of formaldehyde to 2-formyl-3,4-dihydro-(2H)pyran is preferably at least about 1:1; (2) the alkaline condensing agent need only be present in catalytic amounts; and (3) the resulting reaction mixture is catalytically hydrogenated prior to isolation of the desired product by fractional distillation, crystallization or other conventional means well known to those skilled in the art.

In these three embodiments for the preparation of Compound III, the hydrogenation step is preferably carried out at a hydrogenating temperature of less than 150° C. Any catalysts suitable for hydrogenation may be employed, such as nickel catalysts, e.g. Raney nickel or supported nickel; copper-containing catalysts, e.g. reduced copper oxide or copper-chromium oxide; or noble metal catalysts.

The following examples illustrate the preparation of Compound III in these several ways, but are not to be construed as limiting since many variations are possible without departing from the scope of this invention.

Example 5

About 10 parts of Raney nickel catalyst was added to a solution of 16 parts (0.11 mole) of 2,2-bis(hydroxymethyl)3,4-dihydropyran, Compound I, in 150 parts of ethanol. Hydrogenation was carried out at room temperature and at approximately 60 p.s.i.g. hydrogen pressure until the pressure drop indicated the consumption of 0.11 mole of hydrogen. The catalyst was removed by filtration and the remaining clear reaction mixture was concentrated under reduced pressure to a colorless, viscous liquid, which distilled at 92–103° C. at about 0.3 mm. Hg, and which crystallized on standing at room temperature. A purified sample for elemental analysis (boiling at 97–100° C. at about 0.25 mm. Hg, and melting at 44–45° C.) showed 57.45% carbon and 9.48% hydrogen compared to 57.51% carbon and 9.65% hydrogen for pure 2,2-bis(hydroxymethyl)-tetrahydropyran. The bis-p-nitrobenzoic ester, prepared as an identifying derivative, melted at 127–128° C. and gave an analysis of 56.72% carbon, 4.59% hydrogen and 6.28% nitrogen compared to the theoretical values of 56.75%, 4.54% and 6.30% respectively.

Example 6

Fifty-six parts of 2-formyl-3,4-dihydro(2H)pyran (0.5 mole) was added incrementally over a period of about 30 minutes to a mixture of 37.6 parts (0.5 mole) of a 40% formaldehyde solution and enough 1 N sodium hydroxide solution to bring the pH to a value of about 9–11. During this period the temperature was maintained at 26–30° C., after which the mixture was stirred for an additional hour. The reaction mixture was then added to a hydrogenation apparatus together with 10 parts of Raney nickel catalyst. Hydrogenation was carried out at about 150° C. and 1000 p.s.i.g. hydrogen pressure. When hydrogen absorption ceased, the catalyst was removed by filtration and the reaction mixture was distilled. The colorless fraction boiling in the range of 107–111° C. at about 1.0 mm. Hg was collected as the desired product. It crystallized on standing at room temperature and gave a bis-p-nitrobenzoic ester melting at 127–128° C. There was no depression in melting point when it was mixed with the corresponding product prepared in Example 5.

Example 7

Fifty-six parts of 2-formyl-3,4-dihydro(2H)pyran was added incrementally over 1.5 hours to a mixture comprising 24 parts of sodium hydroxide in 78 parts of water and 101 parts of a 37% formaldehyde solution. The temperature during the addition was maintained at about 20° C. and then kept below 30° C. for 3 additional hours. Following this period the mixture was heated to about 55° C. and kept at that temperature for 2 hours. The reaction mixture was then adjusted to a pH of about 8 with formic acid and added to a hydrogenation apparatus together with 10 parts of Raney nickel catalyst. Hydrogenation was carried out at 25° C. and at superatmospheric pressures. The catalyst was removed by filtration and the reaction mixture was then distilled giving a fraction boiling in the range of 110–112° C. at about 1 to 1.15 mm. Hg. This fraction was a colorless oil that crystallized on standing at room temperature. A bis-p-nitrobenzoic ester of the above fraction melted at 127–128° C. and showed no depression in melting point when mixed with the bis-p-nitrobenzoic ester of pure 2,2-bis-(hydroxymethyl)tetrahydropyran, which also melted at 127–128° C.

Illustrating how these products may be employed in the preparation of antifreezes, mixtures composed of equal parts of water and 2,2-bis-(hydroxymethyl)tetrahydropyran, Compound III, gave a satisfactory −15° C. freezing point. A mixture of equal parts of water and 1 - hydroxymethyl-6,8-dioxabicyclo(3.2.1)octane, Compound II, gave a freezing point of −9° C., while a mixture of equal parts of water and 2,2-bis(hydroxymethyl)-3,4-dihydropyran, Compound I, gave a freezing point of −7° C.

These new products may also be used in the preparation of high temperature lubricants. Thus, the distearate of 2,2-bis(hydroxymethyl)-tetrahydropyran, prepared in quantitative yield by heating 11 parts (0.075 mole) of 2,2-bis(hydroxymethyl)-tetrahydropyran, Compound III, and 43 parts (0.15 mole) of stearic acid at temperatures up to 240° C. for 11 hours until 2.7 parts (0.15 mole) of water was collected, had a melting point of 46° C. and was stable to heating at elevated temperatures for long periods of time. Similarly, the stearate of 1-hydroxymethyl-6,8-dioxabicyclo(3.2.1)octane, prepared by heating 13.2 parts (0.1 mole) of 2,2-bis(hydroxymethyl)-3,4-dihydropyran, Compound I, with 57 parts (0.2 mole) of stearic acid at temperatures up to 230° C. for 11 hours until 1.8 parts (0.1 mole) of water was collected (removing 29 parts (0.1 mole) of stearic acid by distillation under reduced pressure), melted at 36° C. and boiled at 190–210° C. at 0.35 mm. Hg and showed the same stability to high temperatures for prolonged periods.

The new compounds of the invention have a number of uses in addition to that of being antifreeze agents for pharmaceuticals and entering into the preparation of high temperature lubricants. The diacetate ester of 2,2-bis-(hydroxymethyl)tetrahydropyran, Compound III, is useful as a solvent for cosmetic preparations such as lipstick and nail polish.

Other valuable derivatives of 1-hydroxymethyl-6,8-dioxabicyclo(3.2.1)octane, Compound II, and 2,2-bis-(hydroxymethyl)tetrahydropyran, Compound III, such as various ethers are unique as reaction solvents in systems involving boron halides and boron hydrides.

Additional varieties of derivatives may be prepared by reacting 2,2-bis(hydroxymethyl)tetrahydropyran, Compound III, with dibasic acids or acid anhydrides to produce alkyd-type resins, useful as protective coatings.

Example 8

An oil modified coating material based on the product of Example 5 illustrates another manner in which these compositions may be used to synthesize protective coating materials. A mixture of 19 parts of 2,2-bis(hydroxymethyl)-tetrahydropyran, 16.6 parts of phthalic anhydride and 16 parts of linseed oil was placed in an open container and heated over a period of 3 hours, with constant agitation, to a final temperature of 260° C. The fluid amber resinous ester was dissolved in an equal weight of a solvent composed of 75 parts toluene and 25 parts butyl acetate. Thin films of this product, with 1% by volume of a 6% cobalt naphthenate, applied to steel panels and baked in an oven for 3 hours at 110° C. gave tough, clear, pliable films.

Example 9

Illustrating how these products may be used in the preparation of protective coating materials, the product of Example 5 in 0.1 molar quantity was treated with a 0.09 molar quantity of maleic anhydride and the mixture heated for a period of 3½ hours at temperatures up to 220° C. with continuous agitation under a nitrogen atmosphere. The resulting clear, pale yellow ester, having an acid number of 13, was dissolved in an equal weight of a solvent consisting of equal parts of acetone and butyl acetate. Thin films of this product, after addition of a 1% solution of 6% cobalt naphthenates, were flowed on steel panels and baked for 20 minutes at 110° C. to give clear, tough, flexible tack-free surfaces.

We claim:
1. 2,2-bis(hydroxymethyl)-3,4-dihydropyran.
2. A process for the preparation of 2,2-bis(hydroxymethyl)-3,4-dihydropyran which comprises reacting an aqueous solution of formaldehyde with 2-formyl-3,4-dihydro(2H)pyran in the presence of an alkaline condensing agent and then recovering the desired product from the reaction mixture.
3. A process for the preparation of 2,2-bis(hydroxymethyl)-3,4-dihydropyran which comprises reacting an aqueous solution of formaldehyde with 2-formyl-3,4-dihydro(2H)pyran in the presence of an alkaline condensing agent, the molar ratio of formaldehyde to 2-formyl-3,4-dihydro(2H)pyran being at least about 2:1, and then recovering the desired product from the reaction mixture.
4. A process for the preparation of 2,2-bis(hydroxymethyl)-3,4 - dihydropyran which comprises adding 2-formyl-3,4-dihydro(2H)pyran to a mixture comprising an aqueous formaldehyde solution containing about 5% to about 40% by weight of formaldehyde and an alkaline condensing agent while maintaining said mixture at a temperature ranging between about 10° C. and about 60° C., the molar ratio of formaldehyde to 2-formyl-3,4-dihydro-(2H)-pyran being at least about 2:1 and the amount of said condensing agent being sufficient to provide at least about one equivalent weight of alkaline agent per mole of 2-formyl-3,4-dihydro(2H)pyran; concentrating the basic reaction mixture; diluting the concentrate thus obtained with a saturated low-boiling aliphatic alcohol; separating the resulting solid phase from the liquid phase; and recovering the desired product from said liquid phase by fractional distillation.
5. 2,2-bis(hydroxymethyl)tetrahydropyran.
6. A process for the preparation of 2,2-bis(hydroxymethyl)tetrahydropyran which comprises reacting an aqueous solution of formaldehyde with 2-formyl-3,4-dihydro(2H)pyran in the presence of an alkaline condensing agent; reducing the resulting reaction mixture by mixture by catalytic hydrogenation; and then recovering the desired product from the reaction mixture.
7. A process for the preparation of 2,2-bis(hydroxymethyl)tetrahydropyran which comprises adding 2-formyl-3,4-dihydro(2H)pyran to a mixture comprising an aqueous formaldehyde solution containing about 5% to about 40% by weight of formaldehyde and an alkaline condensing agent while maintaining said mixture at a temperature ranging between about 10° C. and about 60° C., the molar ratio of formaldehyde to 2-formyl-3,4-dihydro(2H)pyran being at least about 1:1; reducing the resulting reaction mixture by catalytic hydrogenation; and then recovering the desired product from the reaction mixture by fractional distillation.

8. A process for the preparation of 2,2-bis(hydroxymethyl)tetrahydropyran which comprises reducing 2,2-bis(hydroxymethyl)-3,4 - dihydropyran by catalytic hydrogenation and then recovering the desired product from the reaction mixture by fractional distillation.

References Cited in the file of this patent

UNITED STATES PATENTS

| | | |
|---|---|---|
| 2,515,723 | Max et al. | July 18, 1950 |
| 2,532,340 | Schroeder | Dec. 5, 1950 |
| 2,657,219 | Isler et al. | Oct. 27, 1953 |
| 2,694,077 | Stansbury et al. | Nov. 9, 1954 |